United States Patent [19]

Jones

[11] Patent Number: 5,090,608
[45] Date of Patent: Feb. 25, 1992

[54] RESILIENT LINEUP CLAMP

[75] Inventor: Richard L. Jones, Houston, Tex.

[73] Assignee: CRC-Evans Automatic Welding, Houston, Tex.

[21] Appl. No.: 482,167

[22] Filed: Feb. 20, 1990

[51] Int. Cl.⁵ .............................................. B23K 37/053
[52] U.S. Cl. ................................. 228/49.3; 228/219; 228/212; 269/48.1; 269/43
[58] Field of Search ...................... 228/44.5, 49.3, 212, 228/219; 219/160, 161; 279/2 A, 2 R; 269/43, 48.1

[56] References Cited

U.S. PATENT DOCUMENTS

| | | |
|---|---|---|
| 163,217 | 5/1875 | Lawson ................................... 279/2 |
| 2,853,773 | 9/1958 | Darasko . |
| 2,971,556 | 2/1961 | Armstrong et al. . |
| 3,180,130 | 4/1965 | Avera . |
| 3,279,237 | 10/1966 | Rader . |
| 3,387,761 | 6/1968 | Pickard . |
| 3,570,109 | 3/1971 | Harlan . |
| 3,580,044 | 5/1971 | DeVoss et al. . |
| 3,668,359 | 6/1972 | Emmerson . |
| 3,765,665 | 10/1973 | Work . |
| 4,006,619 | 2/1977 | Anderson . |
| 4,101,067 | 7/1978 | Sloan et al. . |
| 4,159,072 | 6/1979 | Lajoie et al. . |
| 4,306,134 | 12/1981 | Slavens et al. . |
| 4,413,655 | 11/1983 | Brown . |
| 4,493,203 | 1/1985 | Wheeler et al. . |
| 4,525,616 | 6/1985 | Slavens . |
| 4,867,368 | 9/1989 | Tesch .................. 228/49.3 |

FOREIGN PATENT DOCUMENTS

| | | |
|---|---|---|
| 1123062 | 8/1959 | Fed. Rep. of Germany . |
| 197712 | 12/1977 | U.S.S.R. . |
| 2205143 | 11/1988 | United Kingdom . |

OTHER PUBLICATIONS

Welding Journal, vol. 66, No. 2, Feb., 1987, p. 14.

*Primary Examiner*—Kenneth J. Ramsey
*Attorney, Agent, or Firm*—Richards, Medlock & Andrews

[57] ABSTRACT

A lineup clamp (10) is disclosed which is particularly suitable for clamping to smaller diameter pipe sections with their ends abutting for welding. Pipes less than twelve inches in diameter can be clamped by the clamp (10). The clamp includes a first resilient element (24) and a second resilient element (28) separated by a separator (26). A hydraulic cylinder (20) is activated to resiliently deform the elements (24, 28) against the separator and the inner surfaces of the abutting pipe sections to clamp the pipe sections in alignment for welding. The clamp is released by removing pressurized hydraulic fluid from the hydraulic cylinder and permitting the resilient elements to rebound to their relaxed configuration.

9 Claims, 3 Drawing Sheets

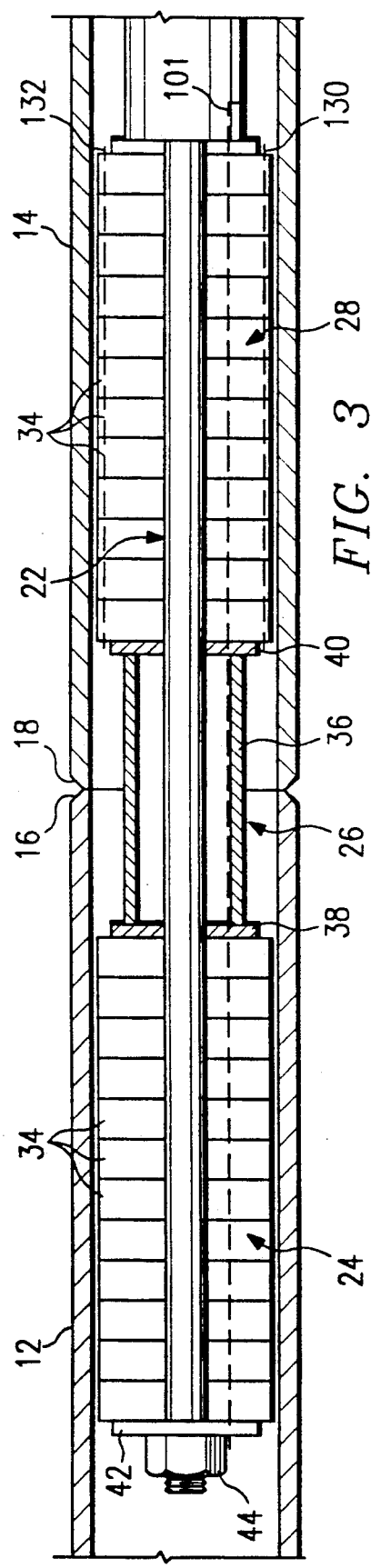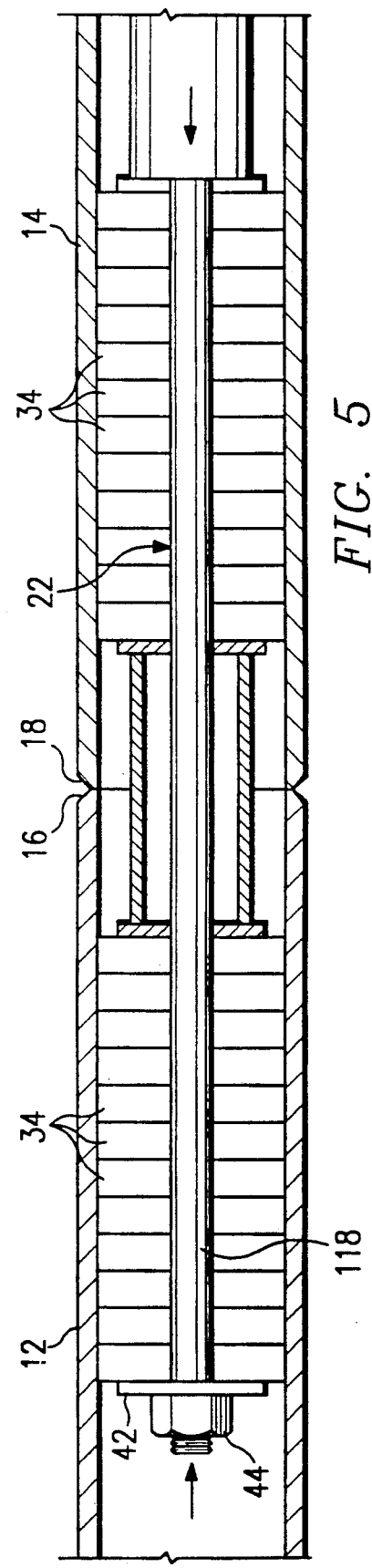

RESILIENT LINEUP CLAMP

TECHNICAL FIELD

This invention relates to a clamp for aligning pipe sections to be welded together, and specifically to a clamp utilizing resilient elements.

BACKGROUND OF THE INVENTION

When welding sections of pipe together to form a pipeline, or the like, it is usually necessary to have some mechanism to hold the abutting ends of the pipe sections to be welded in precise relation to each other to allow formation of a proper weld. The holding and aligning mechanism can be exterior the pipe sections, but this often interferes with the welding operation, which is typically done exterior the pipe sections as well. Over the years, internal pipe aligning mandrels or clamps have been developed for pipes which are actually inserted into the interior of the pipe sections to clamp and align the pipe sections. These mandrels often include air or hydraulically driven radial pistons which move outwardly from the mandrel into contact with the interior surface of the pipe sections to perform the alignment. While such mandrels are effective in use, they are complex and heavy structures which require careful placement within the pipe sections and constant maintenance and service to ensure proper function.

Several years ago, an internal bending mandrel was developed by the assignee of the present application which resulted in U.S. Pat. No. 4,731,203. This mandrel utilized urethane discs which were resiliently deformed by a hydraulic cylinder to expand outward into tight frictional contact with the inner surface of a pipe being bent. The pipe could then be placed in a pipe bending apparatus and bent without collapsing the walls of the pipe. The present invention contemplates the use of advantages provided by such a resilient internal mandrel in the environment of alignment and clamping of pipe sections to be welded.

SUMMARY OF THE INVENTION

In accordance with one aspect of the present invention, a pipe clamp is provided for clamping first and second pipe sections with their ends in abutting engagement for welding. The pipe clamp includes a first element of elastically deformable material positioned within the first pipe proximate its end. A second element is provided of elastically deformable material positioned within the second pipe proximate its end. A separator is positioned within the first and second pipe sections and between the first and second elements. The separator overlies the abutting ends of the pipe sections. A hydraulic cylinder is employed to elastically deform the first and second elements against the separator and interior surfaces of the pipe sections to securely clamp the pipe sections together for welding.

In accordance with another aspect of the present invention, each element is formed of a plurality of urethane discs. In accordance with another aspect of the present invention, a system is provided to purge air from the interior of the pipe sections at their abutting ends and substitute an inert gas to assist the welding operation.

BRIEF DESCRIPTION OF THE DRAWINGS

For a more complete understanding of the present invention and the advantages thereof, reference is now made to the following description taken in conjunction with the accompanying drawings, in which:

FIG. 3 is a cross sectional view of the mandrel portion of the lineup clamp;

FIG. 5 is an illustration of the lineup clamp in the clamping configuration.

DETAILED DESCRIPTION

Figure 1:
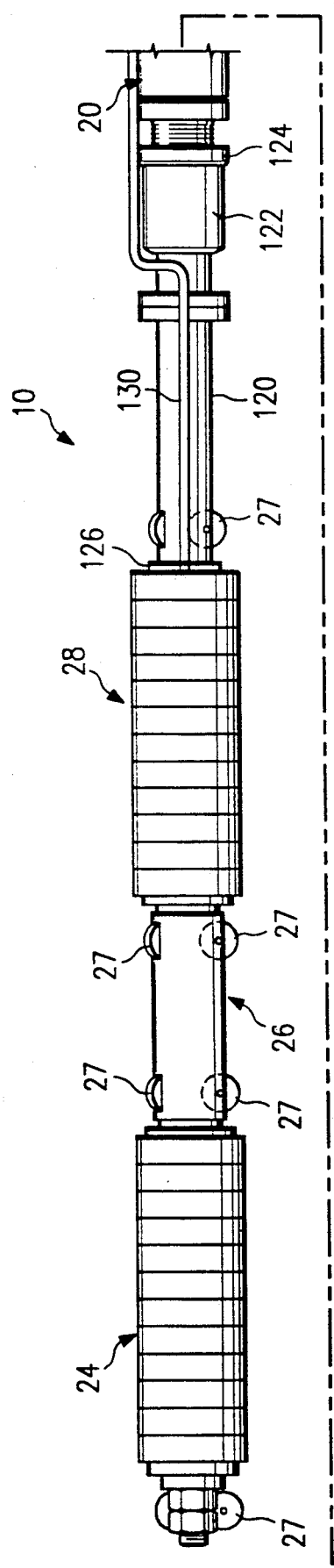
FIG. 1 is a side view a lineup clamp constructed in accordance with the teachings of the present invention.

With reference now to the accompanying drawings, a lineup clamp 10 constructed in accordance with the teachings of the present invention is illustrated. The clamp 10 is inserted within pipe sections 12 and 14 to clamp the pipe sections together in alignment, with the end 16 of pipe section 12 closely proximate or abutting the end 18 of pipe section 14 to form a weld at the adjoining ends by, for example, TIG welding. The clamp 10 also acts to draw the ends of the pipe together, making it possible to set a predetermined precise gap, or no gap at all. In automated welding, it is typical to have the ends in actual physical contact. In manual welding, it is typical to have a small gap between the ends. In either case, the lineup clamp 10 of the present invention can be utilized with great effect.

Figure 2:
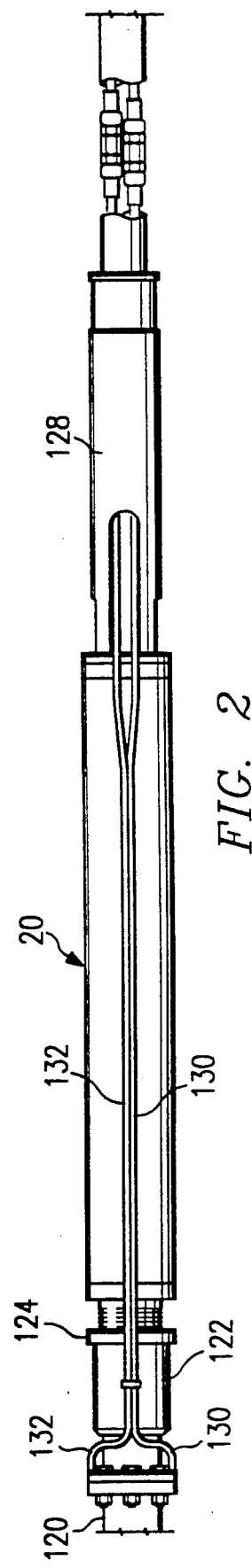
FIG. 2 is a top view of the lineup clamp.

As best seen in FIG. 1 and 2, the lineup clamp 10 includes a hydraulic cylinder 20 with a piston 22 extending therefrom. Along the piston 22 is mounted a first resilient element 24, a separator 26, and a second resilient element 28. As can be seen best in comparing FIGS. 3 and 5, the resilient elements in their relaxed state (FIG. 3) permit the lineup clamp 10 to be easily inserted into the interior of the pipe sections to the desired position. Four sets of wheels 27 are mounted on clamp 10 to facilitate movement of the clamp within the pipe sections. Each set of wheels comprises three wheels distributed at 120° intervals about the circumference of the clamp 10. The wheels are sized so that the clamp 10 can be rolled into position without rubbing of the relaxed resilient elements on the interior surfaces of the pipe sections to prevent asymmetrical wear on the exterior surfaces of the resilient elements. Preferably, a set of wheels is mounted at each end of the two resilient elements. Activation of the hydraulic cylinder 20 causes the resilient elements to deform against the separator 26 and radially outward against the inner surface of the pipe sections to tightly clamp the pipe sections in alignment (and also draws ends 16 and 18 toward each other). A high pressure hydraulic line 30 provides high pressure hydraulic fluid to the cylinder 20 to deform the resilient elements. A hydraulic return line 32 is utilized to return fluid leakage past the seals in the cylinder 20.

With reference now to FIG. 3, the resilient elements 24 and 28 can be seen to comprise a series of annular discs 34, preferably formed of polyurethane. The separator 26 comprises a cylindrical section 36 and end plates 38 and 40. The resilient elements 24 and 28, and separator 26, are confined on the piston by an end plate 42 at the end of the piston 22 and held in place by a nut 44. As can been seen in FIG. 3, if the piston 22 is retracted within the cylinder by hydraulic action, to the right as shown in FIG. 3, the resilient elements are compressed axially, which deforms the discs 34 radially outward and into tight frictional engagement with the inner surface of the pipe sections 12 and 14 to both align and clamp the pipe sections in the desired relation. Because the hydraulic cylinder is not secured to the pipe section, the separator 26 tends to remain in the position that the lineup clamp 10 was installed and the resilient elements effectively are compressed toward the separator when viewed from the reference of the pipe sections. Thus, the hydraulic cylinder would be expected to move slightly toward the separator as well.

Figure 4:
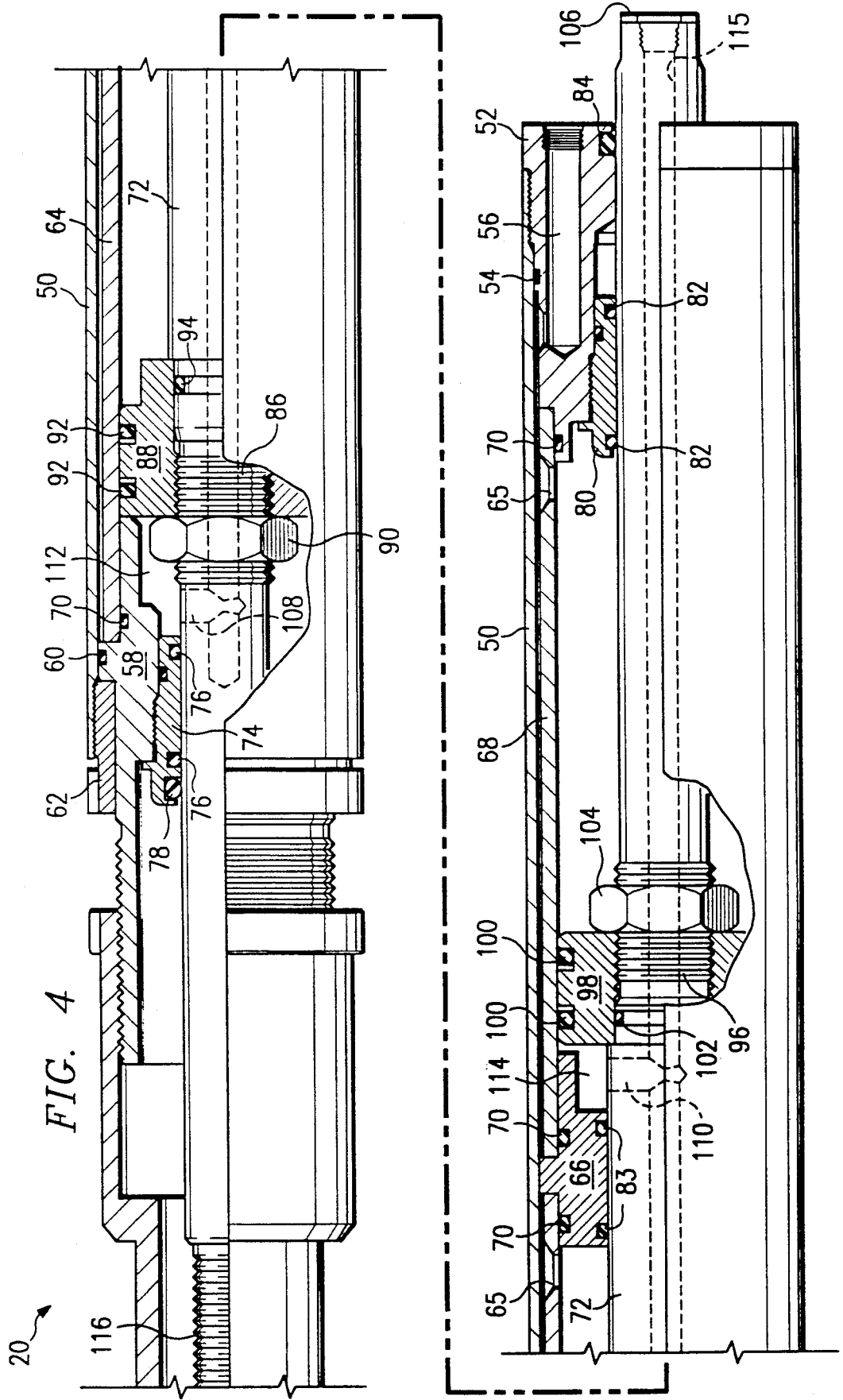
FIG. 4 is a cross sectional view of the hydraulic cylinder portion of the lineup clamp.

With reference now to FIG. 4, the cross section of the hydraulic cylinder 20 is illustrated. To provide sufficient force to deform the resilient elements 24 and 28, cylinder 20 is a two-stage hydraulic cylinder. A cylindrical return barrel 50 is closed at the end distant from the resilient elements by an inlet end cylinder head 52. An O-ring 54 forms a seal between the interior of the return barrel and the cylinder head 52 as illustrated. A port 56 is formed through the cylinder head 52. Port 56 opens proximate the interior surface of the return barrel and is connected to the hydraulic return line 32. The opposite end of the return barrel 50 is closed by a clamp end cylinder head 58. An O-ring 60 provides a seal between the interior surface of the return barrel 50 and cylinder head 58. The cylinder head 58 is secured in place within return barrel 50 by a series of cooperating elements, including a cylinder nut 62, a first cylindrical barrel 64, a center head 66, and a second cylindrical barrel 68 which abuts the cylinder head 52. As can been seen in FIG. 4, as the cylinder nut 62 is threaded into the return barrel 50, the cylinder head 58 is confined between the nut, barrels 64 and 68 and center head 66. O-rings 70 form seals between the cylindrical head, center head and cylindrical barrels as shown.

A hydraulic cylinder shaft 72 passes through the return and cylindrical barrels. A clamp end rod bushing 74 is threaded into the cylinder head 58 which forms a sliding seal with the shaft 72 by use of seals 76 formed by a combination of an O-ring and U-shaped urethane seal ring and a rod wiper 78. Seals 76 are of the type sold under the mark PolyPak by Parker Seal Co. A similarly configured inlet end rod bushing 80 is threadedly received in the cylinder head 52 to provide a sliding seal with the shaft 72 through seals 82 and rod wiper 84. Seals 82 are of the same configuration as seals 76. Seals 83 of the same configuration as seals 76 are used between center head 66 and shaft 72.

The shaft 72 has a threaded portion 86 which receives a clamp end piston 88 secured onto the shaft by a piston retaining nut 90. The piston 88 is in sliding sealed engagement with the interior of first cylindrical barrel 64 through seals 92 (of the same configuration as seals 76) and is sealed to the shaft by O-ring 94. A second threaded portion 96 is formed on the shaft 72 and receives an inlet end piston 98. Seals 100 (of the same configuration as seals 76) provide a sliding seal between the piston 98 and the interior surface of the second cylindrical barrel 68. A seal 102 seals between the piston 98 and the shaft 72. The piston 98 is secured on the shaft by piston retaining nut 104.

A hydraulic fluid passage 105 is formed in shaft 72 which opens at the inlet end 106 of the shaft and through ports 108 and 110 formed along the length of the shaft. Ports 108 and 110 open into a first piston chamber 112 and a second piston chamber 114, respectively. As can be readily understood, application of pressurized hydraulic fluid to the inlet end 106 will pressurize hydraulic fluid in chambers 112 and 114. The pressure acts on the exposed surfaces of pistons 88 and 98 to move the shaft 72 to the right as shown in FIG. 3 relative to the cylindrical barrels 64 and 68 and return barrel 50 to resiliently deform the resilient elements 24 and 26. Release of the pressurized hydraulic fluid will cause the shaft to return to the position shown in FIG. 3 as the resilient elements return to their relaxed configuration. Any hydraulic fluid leaking past the various seals of the hydraulic cylinder returns to the hydraulic pump through ports 65 in barrels 64, port 56 and the hydraulic return line 32.

One end of the shaft 72 has a threaded portion 116 which is coupled with shaft 118. The elements 24 and 28, and separator 26 are mounted along the shaft 118. A clamp support tube 120 is secured to a threaded adapter 122 which, in turn, is threaded onto the cylinder head 58 and locked thereon by lock nut 124. The outer end 126 of the tube 120 contacts the end of the second resilient element 28.

A clamp support tube 128 is mounted to the hydraulic cylinder at cylinder head 52. The support tube 128 protects the portions of the hydraulic lines 30 and 32 as they connect to the hydraulic cylinder. Support tube 128 also acts to provide an attachment point for a reach rod which can be used to insert the lineup clamp 10 to the proper position within the pipe sections. Also, tube 128 supports tubing 130 and 132 which passes along the hydraulic cylinder and through the second resilient element 28 to open into the volume defined by the exterior of the separator 26 and the inner surfaces of the pipe sections at their abutting ends. Tubing 130 provides for inlet of a purging gas, such as argon, while tubing 132 provides for removal of the air within the volume as the inert gas fills the chamber. The volume that must be purged is minimized by the presence of separator 26 as the separator occupies a considerable portion of the interior volume of the pipe sections at the area of welding. Also, a pressure equalizing vent tube 101 represented in dotted line in FIG. 3, is preferably run through the resilient elements 24 and 28 and separator 26 to open at the ends of elements 24 and 28 opposite separator 26 which eliminates the potential for a pressure differential buildup between the interiors of the pipe sections when clamp 10 is in use.

As can been seen, the lineup clamp provides a significant improvement over prior known clamping designs in providing a low cost, reliable and efficient apparatus. Further, the lineup clamp 10 is particularly suitable for use in clamping smaller diameter tubes, for example tubes of less than 12 inch diameter. For example, one lineup clamp constructed in accordance with the present invention has been designed to clamp four inch diameter pipe sections. In that device, each resilient element is about twelve inches long in its relaxed state and is made up of twelve-one inch thick annular polyurethane discs. The separator 26 was about eight inches long and cylindrical section 36 was sized to provide a one-half inch cylindrical gap between its exterior surface and the inner surface of the abutting pipe sections which defines the inert gas chamber. The clamp 10 also provides an advantage in permitted selection of the material of return barrel 50, cylinder heads 52 and 58, and the other components that would actually come in contact with the inner surfaces of the pipe sections relatively independent of the active hydraulic cylinder elements. For example, it is considered harmful to allow a carbon steel to come into contact with stainless steel pipe sections as it may contaminate the stainless steel. Thus, barrel 50 and heads 52 and 58 can be made of stainless steel and other components of the clamp of different materials to eliminate the concern of contamination.

Although a single embodiment of the invention has been illustrated in the accompanying drawings, and described in the foregoing Detailed Description, it will be understood that the invention is rot limited to the embodiment disclosed, but is capable of numerous rearrangements, modifications and substitutions of parts and elements without departing from the scope and spirit of the invention.

I claim:

1. A pipe clamp for clamping first and second pipe sections with their ends in abutting engagement for welding, comprising:
   a first element of elastically deformable material positioned within the first pipe section proximate its end;
   a second element of elastically deformable material positioned within the second pipe section proximate its end;
   a separator within the first and second pipes between the first and second elements and overlying the abutting ends of the pipe sections; means for purging a volume defined between the separator, first and second elements and the interior surfaces of the pipe sections of air and replacing the air with an inert gas; and
   a hydraulic cylinder acting to elastically deform the first and second elements against the separator and interior surfaces of the pipe sections along a sufficient length of the interior surfaces of the pipe sections to avoid line contact to clamp the pipe sections together for welding.

2. The pipe clamp of claim 1 wherein each of said elements are formed of a plurality of annular polyurethane discs.

3. The pipe clamp of claim 1 wherein the hydraulic cylinder includes first and second pistons for enhancing the force exerted by the hydraulic cylinder to deform the first and second elements.

4. The pipe clamp of claim 1 configured to fit within a four inch pipe.

5. A pipe clamp for clamping first and second pipe sections with their ends in proximate abutting engagement for welding, comprising:
   a first element having a length and formed of a plurality of elastically deformable polyurethane discs positioned within the first pipe proximate its end;
   a second element having a length and formed of a plurality of elastically deformable polyurethane discs positioned within the second pipe approximate its end;
   a separator positioned within the first and second pipe sections between the first and second elements and extending over the abutting ends of the pipe sections, said separator defining a cylindrical section and first and second end sections, the first and second elements abutting against the first and second end sections respectively;
   a hydraulic cylinder having a piston extending through said first and second elements and said separator, the piston having an end plate mounted thereon abutting the end of the first element opposite the separator, the hydraulic cylinder abutting the end of the second element opposite the separator, the hydraulic cylinder moving the piston to deform the first and second elements against the separator to rigidly clamp the pipe clamp against the inner surfaces of the pipe sections proximate the abutting ends, the first and second elements being deformed against the inner surfaces of the pipe sections along the entire lengths of the first and second elements to provide a distributed, uniform loading on the inner surfaces of the pipe sections; and
   means for purging a volume formed between the interior surface of the separator, said first and second elements and the interior surfaces of the pipe sections proximate the abutting ends of air and replacing the air with an inert gas to facilitate welding.

6. The pipe clamp of claim 5 wherein said hydraulic cylinder includes:
   a shaft;
   first and second pistons mounted on said shaft spaced one from the other;
   first and second cylindrical barrels;
   means for supporting said first and second cylindrical barrels concentric with the shaft so that the first piston is in sliding sealed contact with the inner surface of the first cylindrical barrel and the second piston is in sliding sealed contact with inner surface of the second cylindrical barrel, said means further defining a first chamber with one side of the first piston forming a portion of the boundary of the first chamber and a second chamber, one side of the second piston forming a portion of the boundary of the second chamber, the shaft having a passage therethrough formed from one end thereof and opening into said first and second chambers.

7. A method for clamping first and second pipe sections with their ends in abutting engagement for welding, comprising the steps of:
   inserting a lineup clamp into the pipe sections so that a first element of elastically deformable polyurethane having a predetermined length is positioned within the first pipe section proximate its end and a second element of elastically deformable polyurethane of predetermined length is positioned within the second pipe section proximate its end, a separator thereby positioned within the first and second pipe sections between the first and second elements and extending over the abutting ends of the pipe sections; and
   providing pressurized hydraulic fluid to the inlet of a hydraulic cylinder which elastically deforms the first and second elements along their entire lengths against the separator and the interior surfaces of the pipe sections to clamp the pipe sections for welding with uniform force exerted by the first and second elements on the interior surfaces of the pipe section.

8. The method of claim 7 further comprising the step of purging the air from a volume defined between the exterior surface of the separator, the first and second elements and the interior surfaces of the pipe sections at the abutting ends and replacing the air with an inert gas to facilitate welding.

9. The method of claim 7 further comprising the step of releasing the hydraulic pressure in the hydraulic cylinder to release the clamp, the resiliency of the first and second elements returning to their relaxed shape to release the pipe clamp.

* * * * *